US011562651B2

(12) United States Patent
Matthiesen et al.

(10) Patent No.: US 11,562,651 B2
(45) Date of Patent: Jan. 24, 2023

(54) AUTONOMOUS VEHICLE NOTIFICATION SYSTEM

(71) Applicant: Lyft, Inc., San Francisco, CA (US)

(72) Inventors: Taggart Matthiesen, Kentfield, CA (US); Jisi Guo, San Francisco, CA (US); Sebastian Rolf Johan Brannstrom, San Francisco, CA (US); Jess Garms, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/825,833

(22) Filed: Mar. 20, 2020

(65) Prior Publication Data

US 2020/0219397 A1 Jul. 9, 2020

Related U.S. Application Data

(63) Continuation of application No. 16/211,131, filed on Dec. 5, 2018, now Pat. No. 10,607,491, which is a continuation of application No. 15/960,360, filed on Apr. 23, 2018, now Pat. No. 10,152,892, which is a continuation of application No. 15/408,150, filed on Jan. 17, 2017, now Pat. No. 9,953,538.

(51) Int. Cl.
| | | |
|---|---|---|
| *G08G 1/005* | (2006.01) | |
| *G08G 1/16* | (2006.01) | |
| *B60Q 1/50* | (2006.01) | |
| *B60Q 1/26* | (2006.01) | |
| *B60Q 1/48* | (2006.01) | |
| *B60Q 1/34* | (2006.01) | |

(52) U.S. Cl.
CPC ............. *G08G 1/166* (2013.01); *B60Q 1/268* (2013.01); *B60Q 1/346* (2013.01); *B60Q 1/482* (2013.01); *B60Q 1/503* (2013.01); *G08G 1/005* (2013.01)

(58) Field of Classification Search
None
See application file for complete search history.

(56) References Cited

U.S. PATENT DOCUMENTS

| | | | | |
|---|---|---|---|---|
| 8,031,085 B1 * | 10/2011 | Anderson | .............. | B60Q 5/008 340/901 |
| 8,571,743 B1 * | 10/2013 | Cullinane | .............. | G08G 1/166 701/23 |
| 8,761,991 B1 * | 6/2014 | Ferguson | ......... | G08G 1/096758 701/28 |
| 8,954,252 B1 * | 2/2015 | Urmson | ................. | G08G 1/166 701/301 |
| 9,120,485 B1 * | 9/2015 | Dolgov | ................. | B60W 30/10 |
| 9,248,834 B1 * | 2/2016 | Ferguson | .......... | B60W 60/0027 |

(Continued)

FOREIGN PATENT DOCUMENTS

JP 2002175590 A * 6/2002

*Primary Examiner* — Jonathan M Dager
(74) *Attorney, Agent, or Firm* — Baker Botts L.L.P.

(57) ABSTRACT

In one embodiment, a method includes detecting, using one or more sensors of a vehicle, an entity in an environment surrounding the vehicle. The method includes determining a position of the entity relative to the vehicle. The method includes determining that a message is to be provided to the entity. The method includes selecting at least one of multiple notification devices of the vehicle based on the position of the entity relative to the vehicle. The method includes providing the message to the entity using the selected notification device.

19 Claims, 13 Drawing Sheets

(56) References Cited

U.S. PATENT DOCUMENTS

| | | | |
|---|---|---|---|
| 9,368,026 B1* | 6/2016 | Herbach | G06F 9/46 |
| 9,405,293 B2* | 8/2016 | Meuleau | G05D 1/0217 |
| 9,463,794 B1* | 10/2016 | Silver | G01C 21/3602 |
| 9,507,346 B1* | 11/2016 | Levinson | G06F 3/04847 |
| 9,517,767 B1* | 12/2016 | Kentley | B60W 30/18 |
| 9,551,992 B1* | 1/2017 | Barton-Sweeney | G08G 1/202 |
| 9,769,616 B1* | 9/2017 | Pao | H04W 4/023 |
| 10,082,562 B1* | 9/2018 | Abari | G01S 13/343 |
| 10,272,827 B1* | 4/2019 | Kemler | G05D 1/0223 |
| 10,306,430 B1* | 5/2019 | Abari | G05D 1/0055 |
| 10,315,563 B1* | 6/2019 | Harper | B60Q 5/006 |
| 10,328,769 B2* | 6/2019 | Ferguson | G07C 9/00563 |
| 11,345,277 B2* | 5/2022 | Lujan | B60Q 1/0035 |
| 2009/0174573 A1* | 7/2009 | Smith | G08G 1/0962 340/905 |
| 2011/0140919 A1* | 6/2011 | Hara | G08G 1/163 340/907 |
| 2012/0083959 A1* | 4/2012 | Dolgov | G06T 7/521 701/23 |
| 2013/0061044 A1* | 3/2013 | Pinkus | G07C 5/08 713/160 |
| 2014/0307247 A1* | 10/2014 | Zhu | B60W 40/064 342/54 |
| 2015/0145661 A1* | 5/2015 | Beggs | G08G 1/005 340/435 |
| 2015/0228195 A1* | 8/2015 | Beaurepaire | G08G 1/0962 340/907 |
| 2015/0268665 A1* | 9/2015 | Ludwick | B60Q 5/008 701/23 |
| 2015/0336502 A1* | 11/2015 | Hillis | G06T 13/80 701/23 |
| 2015/0338849 A1* | 11/2015 | Nemec | G05D 1/0016 701/25 |
| 2015/0369621 A1* | 12/2015 | Abhyanker | H04W 4/024 701/461 |
| 2016/0167608 A1* | 6/2016 | Rai | H04L 67/12 701/36 |
| 2016/0179094 A1* | 6/2016 | Sorokin | B60J 1/04 701/23 |
| 2016/0200317 A1* | 7/2016 | Danzl | B60W 10/04 701/25 |
| 2016/0209845 A1* | 7/2016 | Kojo | G05D 1/0217 |
| 2016/0231746 A1* | 8/2016 | Hazelton | G05D 1/0274 |
| 2016/0291134 A1* | 10/2016 | Droz | G01S 7/4817 |
| 2017/0032197 A1* | 2/2017 | Sim | B60R 1/00 |
| 2017/0120814 A1* | 5/2017 | Kentley | B60Q 5/008 |
| 2017/0248964 A1* | 8/2017 | Kentley | G05D 1/0214 |
| 2018/0188731 A1* | 7/2018 | Matthiesen | G01C 21/3664 |
| 2018/0315146 A1* | 11/2018 | Matthiesen | G01C 21/3453 |
| 2018/0374002 A1* | 12/2018 | Li | G06Q 10/02 |
| 2019/0024430 A1* | 1/2019 | Jeromin | G06V 20/58 |
| 2019/0265703 A1* | 8/2019 | Hicok | G05D 1/0242 |
| 2019/0283746 A1* | 9/2019 | Shalev-Shwartz | G05D 1/0221 |
| 2020/0079363 A1* | 3/2020 | Frederick | B60R 11/04 |

* cited by examiner

AUTONOMOUS VEHICLE NOTIFICATION SYSTEM

PRIORITY

This application is a continuation under 35 U.S.C. § 120 of U.S. patent application Ser. No. 16/211,131, filed 5 Dec. 2018, which issued on 31 Mar. 2020 as U.S. Pat. No. 10,607,491, which is a continuation of U.S. patent application Ser. No. 15/960,360, filed 23 Apr. 2018, which issued on 11 Dec. 2018 as U.S. Pat. No. 10,152,892, which is a continuation under 35 U.S.C. § 120 of U.S. patent application Ser. No. 15/408,150, filed 17 Jan. 2017, which issued on 24 Apr. 2018 as U.S. Pat. No. 9,953,538.

BACKGROUND

Traditionally, transportation and related services have been provided by a human-operated vehicle. Improvements in computer processing have led to increasing efforts to automate more of these services, using autonomous vehicles that do not require a human operator. However, integrating these autonomously-provided services into a mixed autonomous and human-operated environment has many challenges. Drivers and pedestrians are accustomed to interacting in particular ways, removing a driver from some vehicles can lead to uncertainty and miscommunication.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide techniques, including systems and methods, for autonomous vehicles to identify entities in traffic and communicate messages to those entities based on the autonomous vehicle's planned movements. For example, embodiments allow the use of one or more notification devices distributed across an autonomous vehicle to provide messages to nearby entities. As the number of autonomous vehicles on the road increases, the need to better integrate those vehicles with traffic also increases. As discussed, various entities in common traffic scenarios (e.g., other vehicles, cyclists, pedestrians, etc.) are all accustomed to navigating traffic in particular ways. For example, pedestrians may make eye contact with drivers before crossing at a crosswalk, or drivers may motion to one another at a four way stop where right of way is uncertain. As human-operated vehicles are replaced by autonomous vehicles, and no driver is available to interact with other entities, this communication breaks down. Resulting miscommunications can lead to lead to increased data processing and system communications as other entities make less predictable movements around the autonomous vehicle due to uncertainty around how or when the autonomous vehicle will move. Accordingly, embodiments utilize available sensor data to identify nearby entities and provide messages to these entities.

Figure 1:
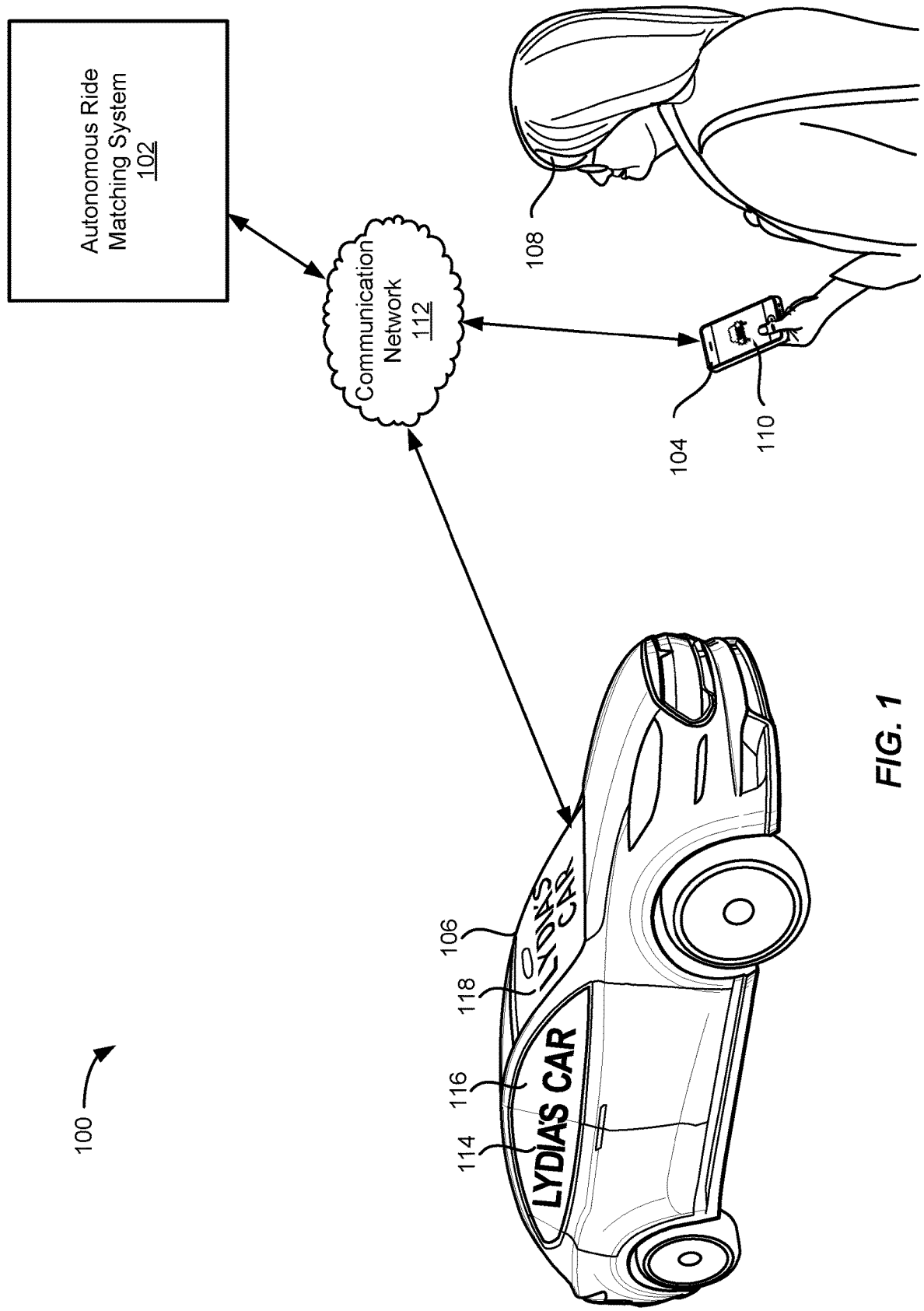
FIG. 1 illustrates an example of an autonomous ride matching system including a matched provider and matched autonomous vehicle, in accordance with an embodiment.

FIG. 1 illustrates an example of an autonomous ride matching service 100 including a matched provider and matched autonomous vehicle, in accordance with an embodiment. A ride matching system 102 may be configured to communicate with both the requestor computing device 104 and autonomous vehicle 106. In various embodiments, autonomous vehicle 106 may include a communications device integrated into the autonomous vehicle that is configured to communicate with autonomous ride matching system 102. Additionally, or alternatively, a separate computing device operable to communicate with both the autonomous ride matching system 102 and the autonomous vehicle 106 may be used to control the autonomous vehicle. A requestor 108 may use a ride matching requestor application 110 on a requestor computing device 104 to request a ride at a specified pick-up location. The request may be transmitted over a communication network 108 to the autonomous ride matching system 102.

The autonomous ride matching system 102 may identify available autonomous vehicles that are within a predetermined distance and/or expected pickup time away from the requestor 108. The ride matching system 102 may send the ride request to autonomous vehicle 106 which may then proceed upon a route to the pickup location provided by requestor 108. The route may be determined by autonomous ride matching system 102, autonomous vehicle 106, or any combination thereof. Because autonomous vehicle 106 may not have a driver or other personnel, it may be difficult for requestor 108 to determine that a given vehicle is her requested autonomous vehicle. Accordingly, autonomous vehicle 106 may include one or more autonomous communication devices 114-118. In this example, each window may include a projector, see-through screen, or other display device that is configured to display a message to entities outside of the autonomous vehicle (here a message "Lydia's Car" showing the name of the requestor). As discussed further herein, these communication devices can replace the verbal and nonverbal communication that normally exists between drivers, passengers, and other entities when in traffic and during pickup/drop-off events.

Figure 2:
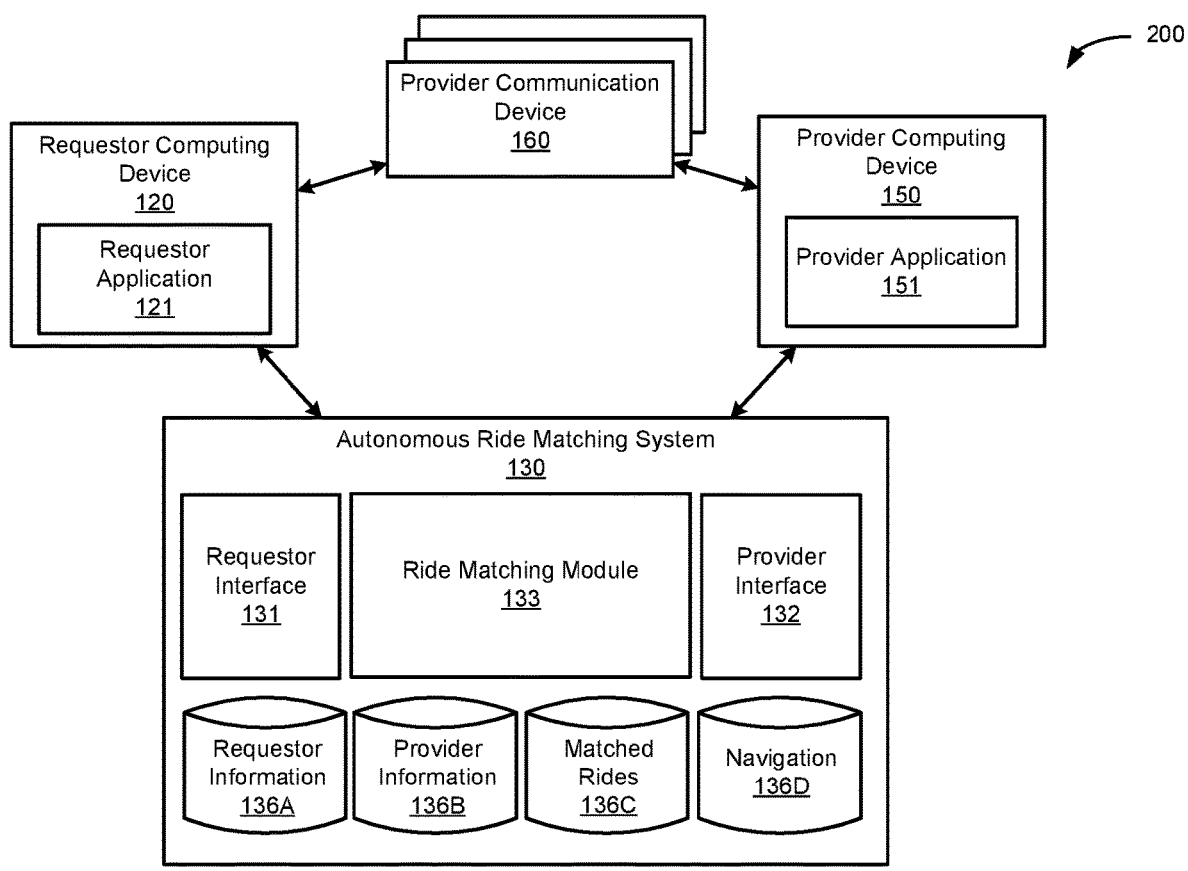
FIG. 2 illustrates an example block diagram 300 of a ride matching system 130 and ride matching environment 300, in accordance with an embodiment.

FIG. 2 illustrates an example block diagram 200 of a ride matching system 130 and ride matching environment, in accordance with an embodiment of the present techniques. As described above, the ride matching system 130 may identify and facilitate request matching from requestors 110 associated with requestor computing devices 120 with available providers 140 associated with provider computing devices 150. The ride matching system 130 may include a requestor interface 131, a provider interface 132, and a ride matching module 133. The ride matching system 130 may also include a requestor information data store 136A, a provider information data store 136B, a matched rides data store 136C, and a navigation data store 136D which may be used by any of the modules of the ride matching system 130 to obtain information in order to perform the functionality of the corresponding module. The ride matching system 130 may be configured to communicate with a plurality of requestor computing devices 120 and a plurality of provider computing devices 150. Although the ride matching system 130 is shown in a single system, the ride matching system 130 may be hosted on multiple server computers and/or distributed across multiple systems. Additionally, the modules may be performed by any number of different computers and/or systems. Thus, the modules may be separated into multiple services and/or over multiple different systems to perform the functionality described herein.

Although embodiments may be described in reference to ride requests, any number of different services may be provided through similar requests and matching functionality. Accordingly, embodiments are not limited to the matching of ride requests and one of ordinary skill would recognize that embodiments could be implemented for any number of different services that have requestors and providers being matched through a network of connected computing devices.

The requestor interface 131 may include any software and/or hardware components configured to send and receive communications and/or other information between the ride matching system 130 and a plurality of requestor computing devices 120. The requestor interface 131 may be configured to facilitate communication between the ride matching system 130 and the requestor application 121 operating on each of a plurality of requestor computing devices 120. The requestor interface 131 may be configured to periodically receive ride requests, location information, a request location (also referred to as a "pick-up" location), requestor status information, a location of the requestor computing device, and/or any other relevant information from the requestor computing device 120 when the requestor application 121 is active on the requestor computing device 120. The ride request may include a requestor identifier, location information for the requestor computing device 120, a pick-up location for the ride request, one or more destination locations, a pick-up time, and/or any other suitable information associated with providing a service to a requestor. The ride request may be sent in a single message or may include a series of messages. The ride matching module 133 may receive the ride request and update a matched rides data store 136C with the ride request information.

Additionally, the requestor interface 131 may be configured to send ride match messages, location information for the provider computing device, provider information, travel routes, pick-up estimates, traffic information, requestor updates/notifications, and/or any other relevant information to the requestor application 121 of the requestor computing device 120. The requestor interface 131 may update a requestor information data store 136A with requestor information received and/or sent to the requestor, a status of the requestor, a requestor computing device location, and/or any other relevant information.

A requestor computing device 120 may include any device that is configured to communicate with a ride matching system 130 and/or provider computing device 150 over one or more communication networks 170. The requestor computing device 120 may comprise a processor, a computer-readable memory, and communication hardware and/or software to allow the requestor computing device 120 to communicate over one or more communication networks 170. For example, a requestor computing device 120 may include a mobile phone, a tablet, a smart watch, a laptop computer, a desktop computer, and/or any other suitable device having a processor, memory, and communication hardware. In some embodiments, the requestor computing device 120 may include a requestor application 121 that is configured to manage communications with the ride matching system 130 and interface with the user (i.e., requestor) of the requestor computing device 120. The requestor application 121 may allow a user to request a ride, monitor the status of a matched ride, pay for a ride, monitor past rides, perform any other requestor-oriented services related to the ride matching system 130, and/or obtain any other requestor-oriented information from the ride matching system 130.

The provider interface 132 may include any software and/or hardware configured to send and receive communications and/or other information between the ride matching system 130 and a plurality of provider computing devices 150. The provider interface 132 may be configured to periodically receive location information of the provider computing device 150, provider status information, and/or any other relevant information from the provider computing device 150 when the provider application 151 is active on the provider computing device 150. Additionally, the provider interface 132 may be configured to send ride requests, location information of a requestor computing device 120, pick-up locations, travel routes, pick-up estimates, traffic information, provider updates/notifications, and/or any other relevant information to the provider application 151 of the provider computing device 150. The provider interface 132 may update a provider information data store 136B with provider information received and/or sent to the provider, provider profile information, a status of the provider, a provider computing device location, and/or any other relevant information.

A provider computing device 150 may include any computing device that is configured to communicate with a ride matching system 130 and/or one or more provider communication devices 160 over one or more communication networks 170. The provider computing device 150 may comprise any device that includes a processor, a computer-readable memory, and communication hardware and/or software to allow the provider computing device 150 to communicate over one or more communication networks 170. For example, a provider computing device 150 may include a mobile phone, a tablet, a smart watch, a laptop computer, a desktop computer, and/or any other suitable device having a processor, memory, and communication hardware. In some embodiments, the provider computing device 150 may include a provider application 151 that is configured to manage communications with the ride matching system 130 and interface with the user of the provider computing device

150. The provider application 151 may allow a user to accept a ride request, monitor the status of a matched ride, obtain or generate navigation directions or a mapped route for a matched ride, get paid for a ride, monitor past rides, perform any other provider-oriented services related to the ride matching system 130, and/or obtain any other provider-oriented information from the ride matching system 130. The provider computing device 150 and the provider application 151 will be discussed in further detail in reference to FIG. 4.

The provider computing device 150 may be configured to communicate with one or more provider communication devices 160 that may be positioned at different locations within the vehicle of the provider. The provider communication devices 160 may be configured to communicate information to a provider or requestor through a display, speakers, and/or other interface components, and/or may be configured to interface with the requestor computing device 120 to identify an accurate location for the requestor. For example, the provider application 151 may be configured to send graphics, a requestor communication identifier, and/or any other information to the one or more provider communication devices 160 to allow the provider communication devices 160 to perform the functionality described herein. Similarly, the provider communication devices may report location information, signal strength information, and/or any other information obtained from interfacing with the requestor computing device to the provider computing device.

The ride matching module 133 may include a software module that is configured to process ride requests, ride responses, and other communications between requestors and providers of the ride matching system 130 to match a requestor and a provider for a requested service. For example, the ride matching module 133 may be configured to identify available providers for a ride request from a requestor by identifying a geographic region associated with the pick-up location and may search a provider information data store 136B to identify available providers within a predetermined distance of the pick-up location and/or the geographic region. The ride matching module 133 may provide the ride request to the provider interface 132 with the provider contact information or provider identifier so that the ride request may be sent to one or more available providers.

The ride matching module 133 may send the ride request and/or the information from the ride request to one or more of the available providers to determine whether the available providers are interested in accepting the ride request. The one or more available providers may receive the ride request through the provider application 151 of the provider computing device 150, may evaluate the request, and may accept or deny the request by providing an input through the provider application 151. A ride response message may be sent to the ride matching system 130 indicating whether a ride was accepted and including a provider identifier, a location of the provider, and/or any other suitable information to allow the ride matching system 130 to process the response. Alternatively, the provider may ignore the request and after a predetermined period of time, the request may be considered denied and a corresponding ride response message may be sent to the ride matching system 130. In some embodiments, no response may be sent unless a ride request is accepted and the ride will be assumed to be denied unless a response is received from the provider.

The ride matching module 133 may receive the ride response, evaluate whether the provider accepted or declined the request, and may either find additional available providers for the request (if declined) or determine the ride request has been accepted and send matched ride information to the requestor computing device 120 and the provider computing device 150. The matched ride information may include provider information, requestor information, the pick-up location, the current location of the provider computing device, the current location of the requestor computing device, a requestor communication identifier, a provider communication identifier, an estimated time of arrival for the provider, and/or any other suitable information to allow the requestor and the provider to complete the requested service. The ride matching module 133 may update the matched rides data store 136C with the corresponding matched ride information for the matched ride.

Figure 3:
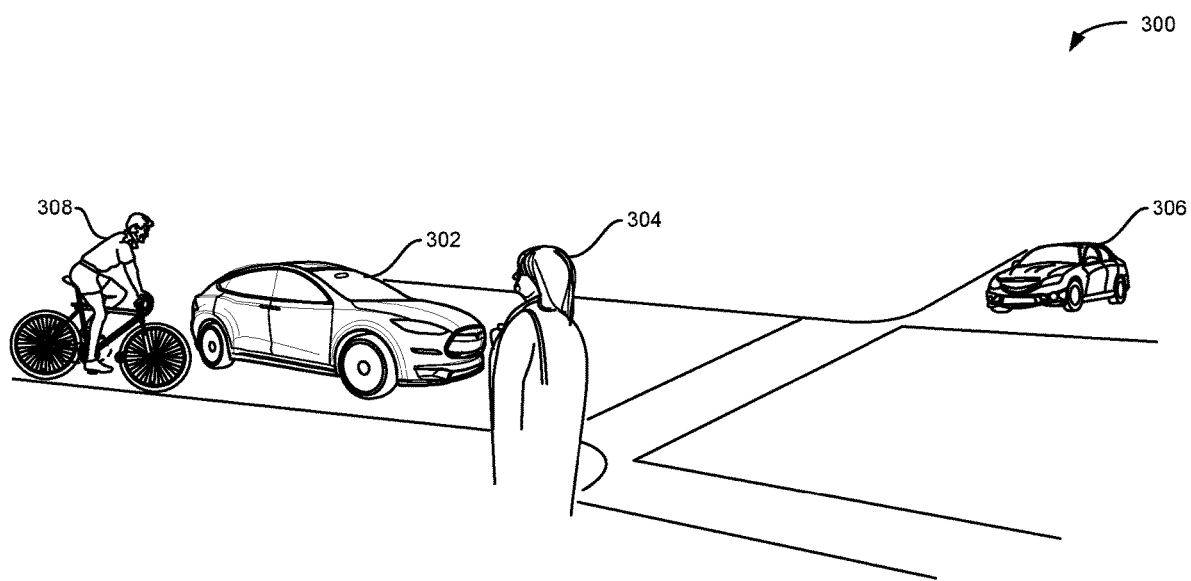
FIG. 3 illustrates an example traffic environment.

FIG. 3 illustrates an example traffic environment 300. Under ordinary driving conditions, a driver of a vehicle 302 may interact with various entities in traffic and during pickup/drop-off events. For example, a pedestrian 304 may make eye contact with a driver of vehicle 302 before entering the cross walk. Similarly, a driver of vehicle 306 may gesture to the driver of vehicle 302 when stopped at a four way stop to indicate he is yielding. Cyclists 308 may similarly attempt to communicate with drivers of cars or other entities when to ensure safety. When one or more of these entities are replaced with autonomous vehicles, lacking a driver or other person with whom to communicate, these verbal and nonverbal communications are lost, making it difficult for other drivers, pedestrians, or other entities to discern the intent of the autonomous vehicle. This may lead to less safe driving conditions, increased traffic, or other problems.

Figure 4:
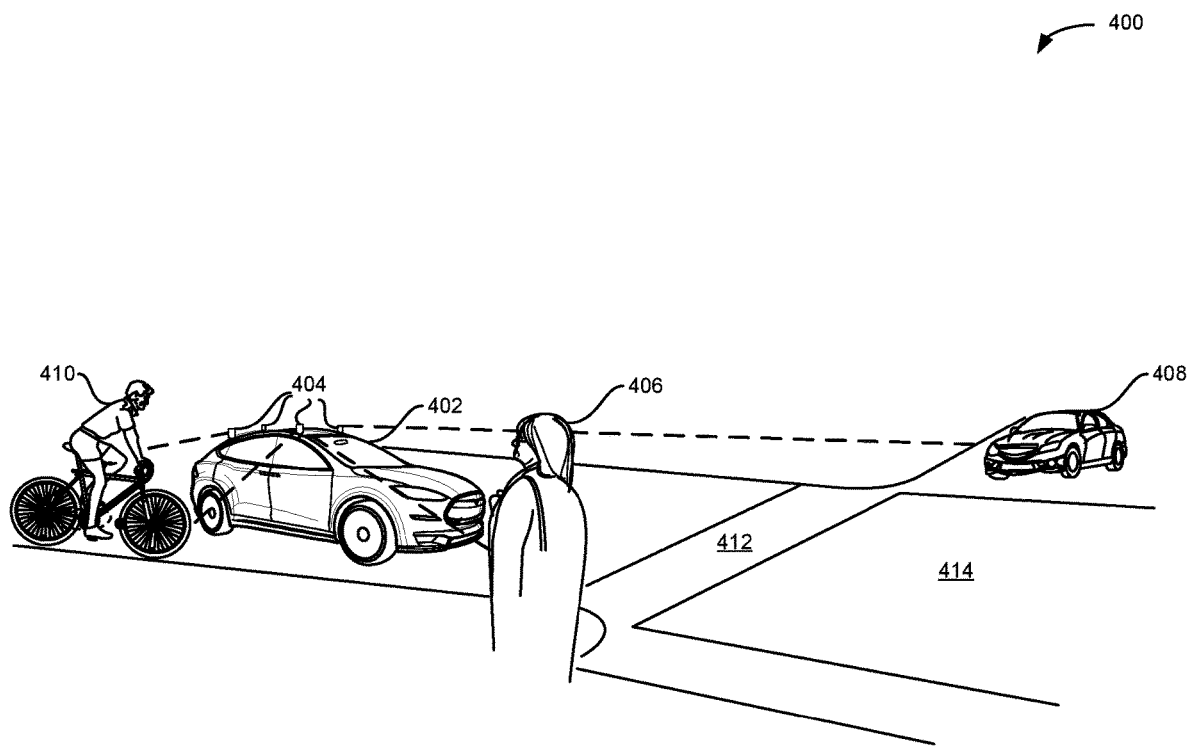
FIG. 4 illustrates an example of an autonomous vehicle identifying objects in a traffic environment, in accordance with an embodiment.

FIG. 4 illustrates an example 400 of an autonomous vehicle identifying objects in a traffic environment, in accordance with an embodiment. As shown in FIG. 4, an autonomous vehicle 402 may operate in the same or similar traffic environment as that discussed above with respect to FIG. 3. As discussed above, a driver may communicate with various entities in traffic (other drivers, pedestrians, cyclists, etc.) to improve traffic flow, confirm right of way, yield, etc. However, an autonomous vehicle, having no traditional driver, is not able to communicate with other entities in traffic in the same way (e.g., eye contact, gestures, sounds etc.). This may lead to poorer traffic flow and potentially accidents, as typical communications that drivers are accustomed to are not available.

As such, embodiments provide an autonomous communications system that facilitates communication from autonomous vehicles to other entities in traffic. As shown in the example of FIG. 4, an autonomous vehicle 402 may include one or more sensors, such as sensor array 404, used to identify objects around the autonomous vehicle, as well as the roadway, lane, direction, location, and other objects and roadway conditions the autonomous vehicle may encounter. Sensor array 404 may include electromagnetic sensors, including RADAR, LiDAR, infrared, ultraviolet, optical, and other sensors, acoustic sensors, position sensors, and other sensors. Various analyses, such as object recognition, facial recognition, and other computer vision techniques may be used to identify entities in traffic.

In various embodiments, when an entity is identified, a location and/or direction relative to the autonomous vehicle may also be identified. For example, pedestrian 406 may be identified and determined to be in front of autonomous vehicle 402. Similarly, vehicle 408 and bicycle 410 may be identified and determined to be to the left and right, respectively, of autonomous vehicle 402. In addition to the entities

406, 408, 410, a movement context may be identified for each entity. Based on the movement context, the autonomous vehicle 402 can determine likely movement associated with the entity as well as the expected movement of the autonomous vehicle relative to that entity. In various embodiments, each movement context may be defined as one or more characteristics of an entity that are associated with one or more expected movements. For example, a movement context may be a data structure having one or more data tags. The data tags may include: current state of the entity (e.g., stopped or moving), current velocity (e.g., speed and direction) of the entity, current location of the entity relative to the autonomous vehicle, current direction the entity is facing, etc. In some embodiments, the data tags may include movement signals received from the entity. For example, the entity may be signaling an intent to turn (e.g., using a turn signal, hand signal, or other signal). When an entity is detected the one or more characteristics of the entity can be determined based on an analysis of sensor data collected about that entity. The one or more characteristics may be matched to the one or more data tags of the movement contexts. The movement context that matches the most characteristics may then be identified, the identified movement context (e.g., data structure) indicating an expected movement associated with the entity. In some embodiments, the data structures may be updated as more characteristic data is collected from entities performing movements associated with the data structures.

Figure 5:
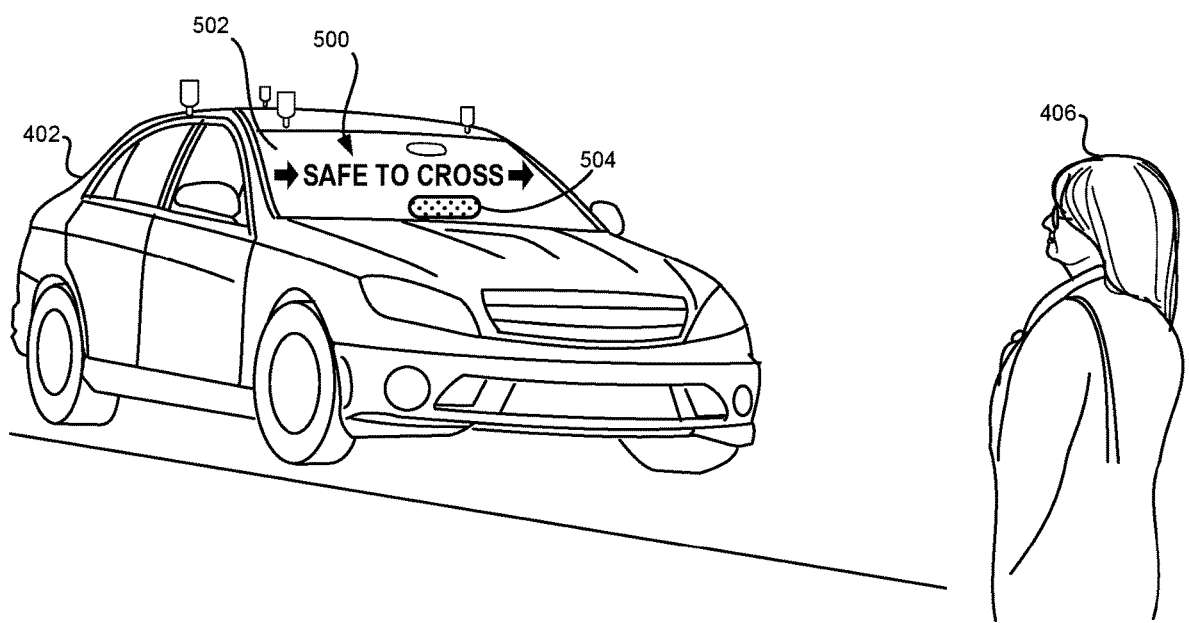
FIGS. 5-7 illustrate examples of an autonomous communication device of an autonomous vehicle presenting notifications to objects in a traffic environment, in accordance with an embodiment.

For example, pedestrian 406 may be determined to be waiting at a crosswalk 412 at an intersection 414, looking at autonomous vehicle 402 as it approaches the intersection. In this movement context, in a traditional interaction, the pedestrian may make eye contact with the driver before entering the crosswalk. In this example, with no driver, the pedestrian may pause, unsure of what the autonomous vehicle may do next. As shown in FIG. 4, based on the movement context, an autonomous communication device associated with autonomous vehicle 402 may cause a message to be displayed to the pedestrian. As shown in FIG. 5, the message 500 "SAFE TO CROSS" may be displayed on the windshield 502 of autonomous vehicle 402. As discussed, the direction of the entity (in this example, in front of autonomous vehicle 402) can be used to determine in what direction (e.g., using what display device) the message will be displayed. In some embodiments, one or more windows in autonomous vehicle 402 may be equipped with a projector that can display different messages on different windows. In some embodiments, one or more windows may include transparent or translucent LCD or other see-through displays. In some embodiments, the message displayed on the autonomous vehicle's display device(s) may scroll, flash, or otherwise draw the entity's attention. In some embodiments, if the direction of the entity changes, the message may be displayed on a second display device based on the entity's new location. In some embodiments, the display device may include one or more autonomous communication devices 504 or screens that may be mounted to one or more locations within autonomous vehicle 402, such as a dashboard-attached, window-attached, or other similar device. For example, the autonomous communication device may turn green when it is safe for the pedestrian to cross. In some embodiments, multiple autonomous vehicles may be stopped at a given intersection. When one vehicle has detected an entity, such as pedestrian 406, that entity's location may be communicated to the other autonomous vehicles, enabling each vehicle to display the same or different message to the pedestrian. The messages may be communicated directly between each vehicle, e.g., where the vehicles are connected via mesh network or other wireless communications network. In some embodiments, messages may be communicated to the other vehicles indirectly, through the ride matching service. For example, when an entity is detected by a vehicle, that event may be sent to the ride matching service. The event details may include the entity's location and the message being displayed to the entity by the vehicle. The ride matching service may then identify other vehicles in an area around the entity's location and provide the message (or a different message) to be displayed to the entity. This allows for vehicles that may be positioned more closely to the pedestrian, or more easily seen by the pedestrian, to provide messages to the pedestrian.

Figure 6:
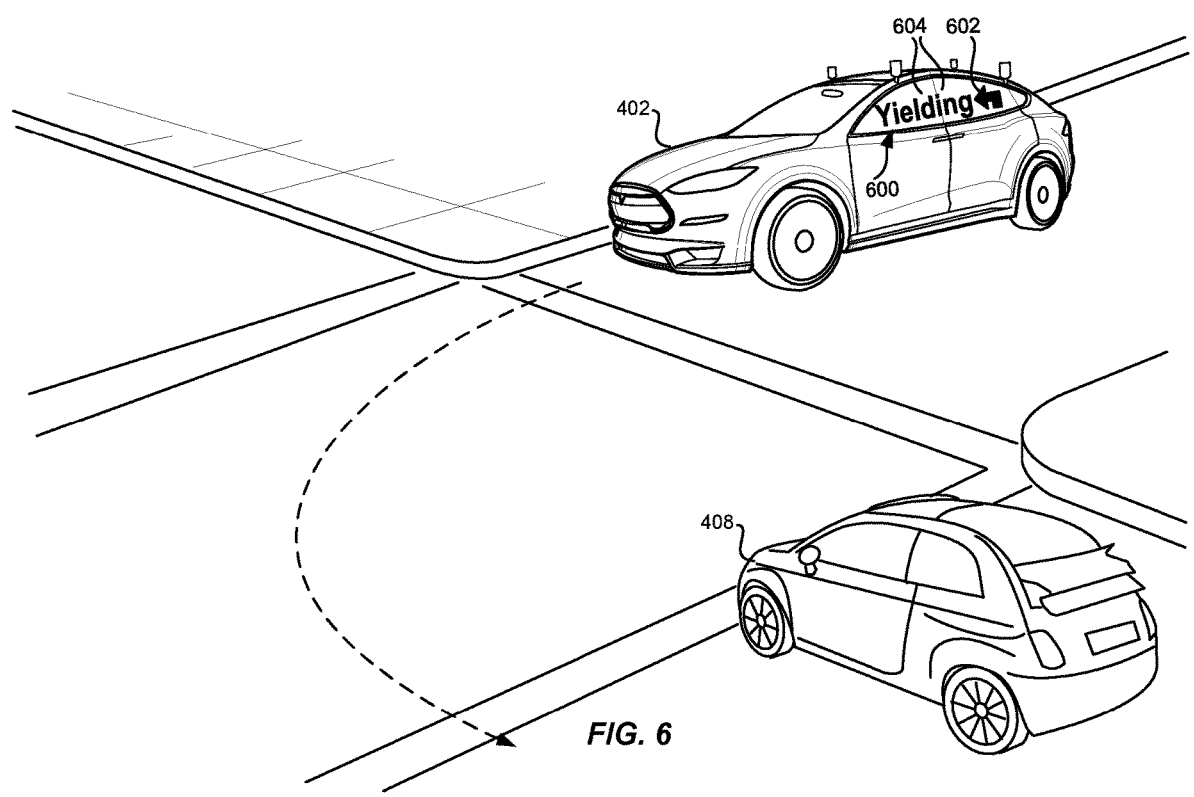

As shown in FIG. 6, vehicle 408 may be determined to be to the left of autonomous vehicle 402 (e.g., approximately 270 degrees from the direction of travel of autonomous vehicle 402). Depending on the type of intersection 414, different movement contexts may be associated with vehicle 408. For example, at a four-way stop the autonomous vehicle can determine whether vehicle 408 stopped first. If vehicle 408 stopped first, autonomous vehicle 402 may display message 600 "YIELDING" with an arrow 602 indicating that the autonomous vehicle will be turning left once vehicle 408 clears the intersection. As shown, message 600 can be displayed across one or more display devices, such as side windows 604. In a different movement context, for example if autonomous vehicle 402 stopped first at the intersection, a different message such as "TURNING LEFT" may be displayed instead of "YIELDING" to indicate to the driver of vehicle 408 that the autonomous vehicle has recognized the other vehicle at the intersection and is proceeding to turn left. As discussed, multiple autonomous vehicles may communicate with one another, either directly through a mesh network or other wireless communications network, or indirectly through a ride matching service. When the detected entity, such as vehicle 408, is an autonomous vehicle, the autonomous vehicles may coordinate their movements at the intersection through the communication network or ride matching service, without displaying message 600.

Figure 7:
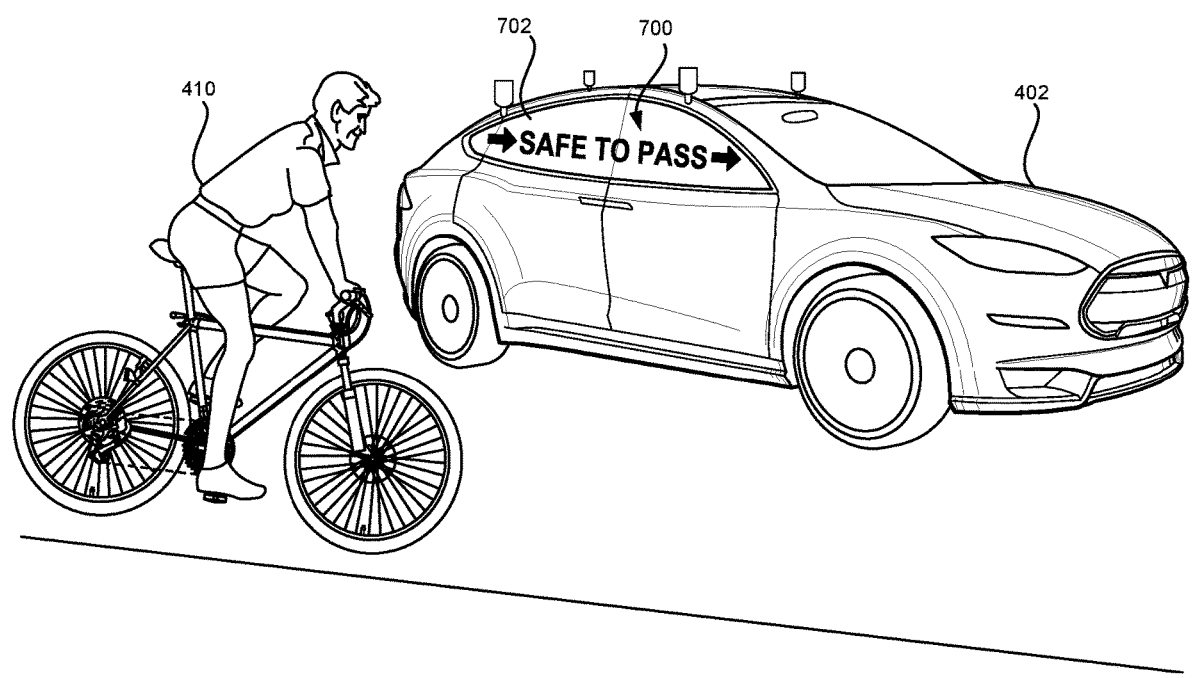

Similarly, as shown in FIG. 7, autonomous vehicle 402 may identify bicycle 410. Based on the speed, location, and direction of the bicycle, autonomous vehicle 402 may determine the movement context to be that the bicycle is passing on the right. As discussed above, autonomous vehicle 402 is turning left at the intersection. As such, the bicycle 410 is not at risk of colliding with the autonomous vehicle (e.g., as it would if autonomous vehicle 402 were to turn right at the intersection). As such, message 700 "SAFE TO PASS" can be displayed on one or more display devices on the right side of autonomous vehicle 402, such as side windows 702. In some embodiments, a wing mirror or other surface along the side of the vehicle may be used to display a message to entities along the side of the autonomous vehicle. If the vehicle were to be turning right, a message such as "WARNING TURNING RIGHT" could be displayed to indicate to the cyclist that the autonomous vehicle will be turning right at the intersection.

Figure 8:
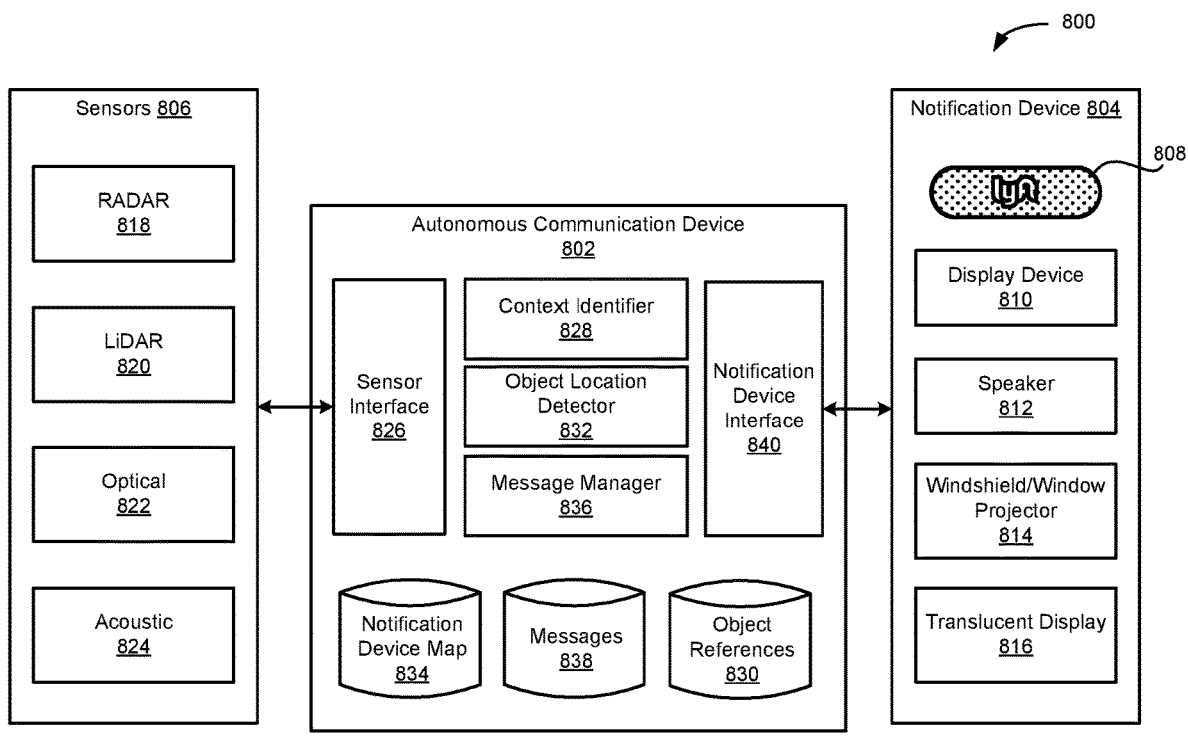
FIG. 8 illustrates an example block diagram of an autonomous communication device, in accordance with an embodiment.

FIG. 8 illustrates an example block diagram 800 of an autonomous communication device, in accordance with an embodiment. Autonomous communication device 800 may be an example of provider communication device 160 shown in FIG. 2. As discussed, the autonomous communication device may communicate with a ride matching system, as well as with other autonomous vehicles through a mesh network, cellular network, or other wireless communication network. As described above, an autonomous communication device 802 can cause information to be displayed on one or more notification devices 804 based on sensor data gathered by one or more sensors 806. As shown in FIG. 8, notification devices 804 may include a portable communication device 808 which may be configured to display different colors, patterns, messages, or other visual data. The notification devices may also include a display device 810, such as an LCD or LED panel, a speaker 812 configured to play audible messages, a windshield/window projector 814 configured to cause visual data to be displayed on the windshield and/or windows of an autonomous vehicle, and/or a translucent display applied to, or replacing, one or more windows/windshields of the autonomous vehicle. Although particular notification devices are described herein, the types of devices are intended to be illustrative and are not intended to be limiting.

As discussed, the content of a message and notification device used to display the message can vary depending on the movement context determined by the autonomous vehicle. In various embodiments, an autonomous vehicle may include one or more sensors 806 that collect data related to the autonomous vehicle, the environment, objects, and/or entities. These sensors may include, but are not limited to, RADAR 818, LiDAR 820, optical sensors 822, acoustic sensors 824, or other sensors. Although the autonomous communication device 802 is shown in a single system, the autonomous communication device 802 may be distributed across multiple systems and/or integrated into an autonomous vehicle controller. Additionally, the modules may be performed by any number of different computers and/or systems. Thus, the modules may be separated into multiple services and/or over multiple different systems to perform the functionality described herein.

Sensor interface 826 may include any software and/or hardware components configured to send and receive sensor data from a variety of sensors 806. Sensor interface 826 can be extensible to support more or fewer sensors 806 than are shown. In some embodiments, sensor interface 826 can receive sensor data in a first format and convert it to a second format usable by the autonomous communication device 802. Context identifier 828 can use the sensor data to identify the current movement context of the autonomous vehicle. As discussed, the movement context can include current traffic and roadway conditions, nearby entities, autonomous vehicle status (e.g., speed, direction, etc.), and other data. For example, optical sensors 822 may collect image data of the surrounding traffic environment. Using the example shown in FIG. 4, object recognition and computer vision techniques may be applied to the image data to identify entities 406-410, as well as intersection 414 and crosswalk 412. In some embodiments, object reference data 830 may include data used in object recognition, such as a library of road signs, location/street names, vehicle images/radar data, and other data. For example, the sensor data can be compared to the object reference data 830 and a relevance score can be calculated for each item of object reference data. The object having the highest relevance score can be identified as matching the sensor data.

In some embodiments, context identifier 828 can match the sensor data to one or more predefined movement contexts. For example, an autonomous vehicle's travel may be limited to a particular geographic region or particular routes. Within that limited area, movement contexts may be generalized. For example, the autonomous vehicle may only travel in an area that includes all-way stops and traffic lights.

In this example, the movement contexts may be generalized into a road context, all-way stop context, and traffic light context. Messages may be defined for each type of likely entity to be encountered (e.g., other cars, pedestrians, cyclists, etc.). Context identifier 828 can use the sensor data to match the current state of the vehicle to one of these movement contexts, and then retrieve corresponding messages for each entity identified in the current movement context.

Object location detector 832 can use the sensor data to determine the location of entities identified by context identifier 828 relative to the autonomous communication device 802 and/or relative to an autonomous vehicle in which autonomous communication device 802 is installed. For example, optical sensors, such as cameras, can capture images of a known field of view, based on the location of the sensors. Entity locations can then be estimated based on the apparent location in the image data or across images captured by multiple cameras. A notification device map 834 can be used determine one or more notification devices in view of an entity, based on that entity's location determined by object location detector 832. In some embodiments, notification devices may be mapped to ranges of locations, such as ranges of angles measured from the autonomous vehicle's direction of travel. For example, a windshield projector 814 and portable communication device 808 may map to locations in front of the autonomous vehicle, while window projectors on side windows may map to the left and right sides of the vehicle.

Message manager 836 can identify a message from message data 838 to be provided through a notification device 804. The movement context identified by context identifier 828 can be associated with one or more predetermined messages. Common messages may include autonomous vehicle actions (e.g., "turning left/right", "yielding", "stopping", etc.) and messages to other entities (e.g., "safe to cross", "safe to pass", "warning do not cross", "warning turning left/right", etc.). Each entity identified in the movement context may be associated with one or more of the messages associated with the movement context. For example, a pedestrian may be associated with a crossing message, while a cyclist or other vehicle may be associated with a vehicle action message. Message manager 836 can retrieve the messages for the entities in the movement context and cause the message to be provided through an appropriate notification device 804 based on the location of the entities and the corresponding mapped notification devices. In various embodiments, notification device interface 840 can provide the messages to the appropriate notification devices. Notification device interface 840 can be extensible to include more or fewer notification devices. In some embodiments, each notification device can be registered with the notification device interface 840. Registration can include providing direction information indicating in what direction the notification device is configured to provide information. In some embodiments, notification device interface 840 can update notification device map to include the direction information for the notification device when it is registered.

Figure 9:
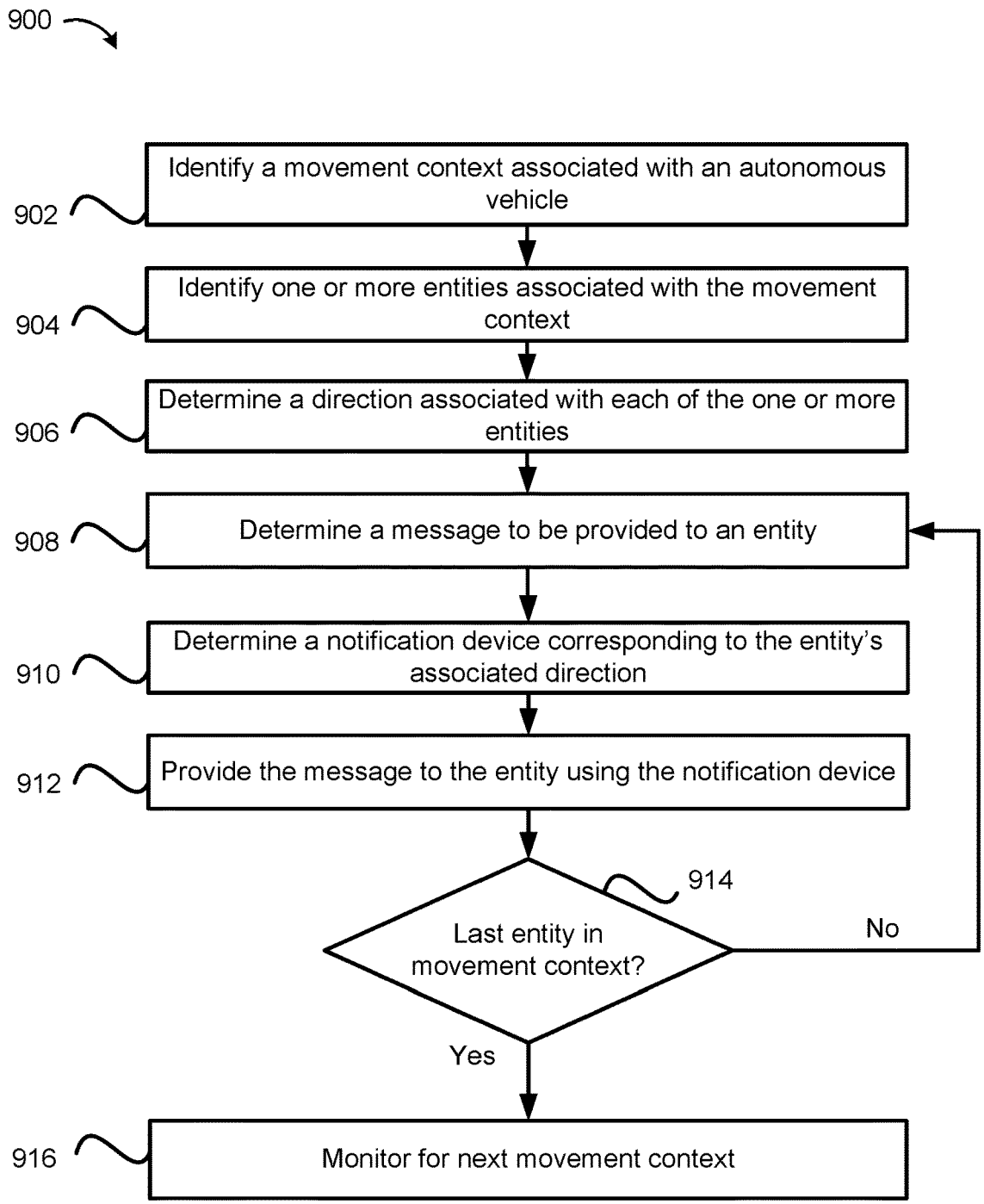
FIG. 9 illustrates an exemplary flow diagram of a method for presenting autonomous notifications, in accordance with an embodiment.

FIG. 9 illustrates an exemplary flow diagram of a method 900 for presenting autonomous notifications, in accordance with an embodiment. At step 902, the autonomous communication device can determine a movement context of the autonomous vehicle. For example, the autonomous vehicle may be associated with various sensors (e.g., RADAR, LiDAR, acoustic, optical, etc.) each producing sensor data describing the area in which the autonomous vehicle is operating. The sensor data can be analyzed to determine roadway conditions (e.g., highway, residential, intersection type, other vehicles, etc.) and/or determine the movement of the autonomous vehicle (e.g., current speed). In some embodiments, the movement context may be selected from a plurality of movement contexts based on the roadway conditions and the movement of the autonomous vehicle.

At step 904, at least one entity can be identified in the movement context. For example, the sensor data can be analyzed to identify one or more objects. These objects can be compared object references to determine a plurality of scores. The at least one entity can be determined based on the plurality of scores. For example, a highest scoring object reference may be determined to match the at least one entity.

At step 906, a direction associated with the at least one entity can be determined. For example, the sensor data can include an angular value, vector, or other directional information. In some embodiments, a sensor may collect data from a particular area relative to the direction of travel of the autonomous vehicle. Any object identified in sensor data from such a sensor can be associated with a direction corresponding to the location of the particular area relative to the autonomous vehicle.

At step 908, a message associated with the at least one entity in the movement context can be determined. As discussed, each movement context may be associated with one or more messages for different types of entities that may be present. For example, messages for other cars, pedestrians, and cyclists may all be predetermined and associated with a movement context. Messages associated with each entity in the movement context may be retrieved.

At step 910, a notification device corresponding to the direction associated with the at least one entity can be determined. As discussed, notification devices may be distributed in or on an autonomous vehicle such that the devices are configured to show messages in different directions. For example, each window or windshield of the vehicle may be associated with a projector or a translucent display configured to display messages on the windows and windshields.

At step 912, the message can be provided to the at least one entity using the notification device. In some embodiments, the notification device associated with the direction can be identified using a notification device map. The device map can map directions to device identifiers. Using the map, a device identifier associated with the notification map can be determined. A message can then be sent to the notification device using the device identifier. For example, the device identifier may be a network address or other endpoint to which the message can be sent.

At step 914, it can be determined whether there are additional entities in the movement context. If so, processing can return to step 908 and the next entity can be processed. For example, one entity can be located in front of a vehicle, another can be on the right side, and another can be at the rear of the vehicle. Each entity can be identified and an appropriate message displayed using the appropriate notification device or devices. In some embodiments, multiple entities can be identified serially or in parallel. At step 916, if messages have been displayed for all entities, the autonomous communication device can monitor sensor data for the next movement context and/or a change in the current movement context, such as the arrival or departure of entities from the current movement context.

Figure 10:
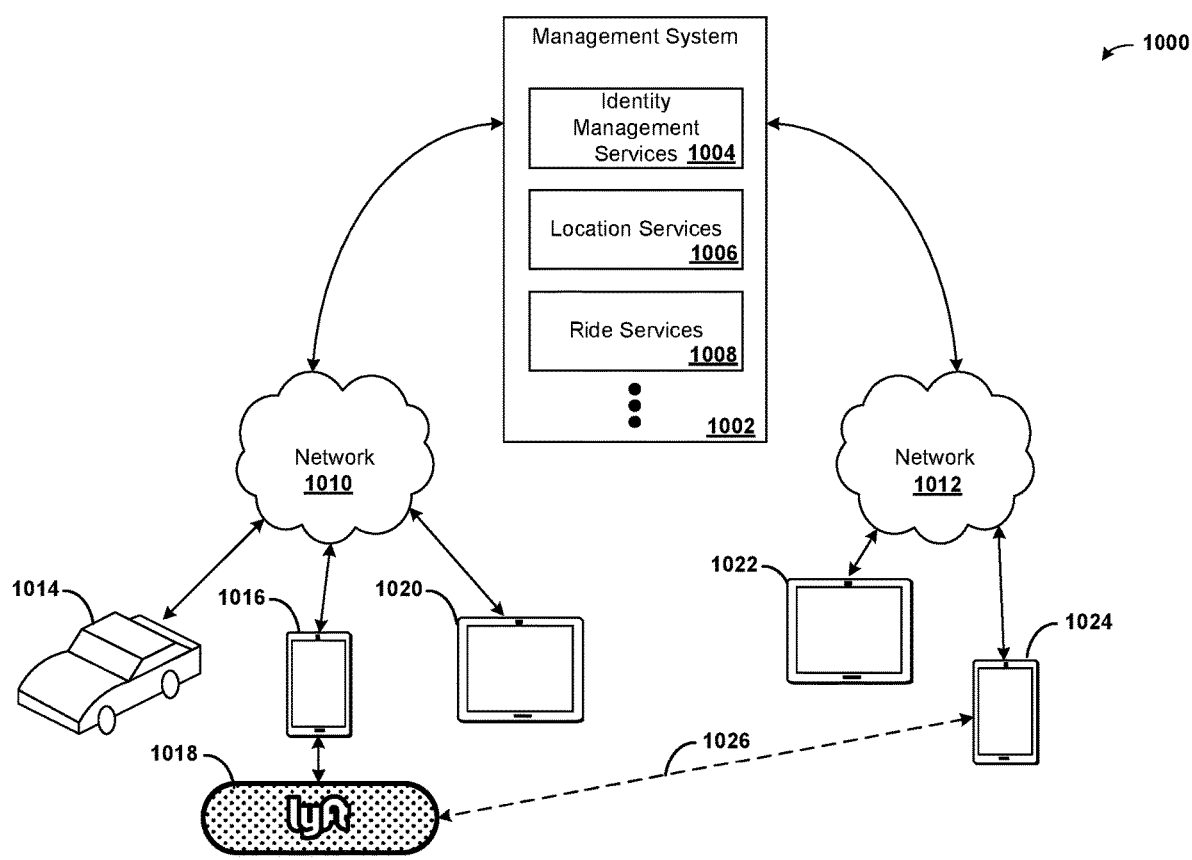
FIG. 10 illustrates an example requestor/provider management environment, in accordance with various embodiments.

FIG. 10 shows a requestor/provider management environment 1000, in accordance with various embodiments. As shown in FIG. 10, a management system 1002 can be configured to provide various services to requestor and provider devices. Management system 1002 can run one or more services or software applications, including identity management services 1004, location services 1006, ride services 1008, or other services. Although three services are shown as being provided by management system 1002, more or fewer services may be provided in various implementations. In various embodiments, management system 1002 may include one or more general purpose computers, server computers, clustered computing systems, cloud-based computing systems, or any other computing systems or arrangements of computing systems. Management system 1002 may be configured to run any or all of the services and/or software applications described with respect to various embodiments described herein. In some embodiments, management system 1002 can run any appropriate operating system as well as various server applications, such as common gateway interface (CGI) servers, JAVA® servers, hypertext transport protocol (HTTP) servers, file transfer protocol (FTP) servers, database servers, etc.

For example, identity management services 1004 may include various identity services, such as access management and authorization services for requestors and providers when interacting with management system 1002. This may include, e.g., authenticating the identity of providers and determining that the providers are authorized to provide services through management system 1002. Similarly, requestors' identities may be authenticated to determine whether the requestor is authorized to receive the requested services through management system 1002. Identity management services 1004 may also control access to provider and requestor data maintained by management system 1002, such as driving and/or ride histories, personal data, or other user data. Location services 1006 may include navigation and/or traffic management services and user interfaces, or other location services.

In various embodiments, ride services 1008 may include ride matching and management services to connect a requestor to a provider. Ride services 1008 may include a user interface and or may receive data from requestors and providers through applications executing on their respective devices. Ride services 1008 may, e.g., confirm the identity of requestors and providers using identity management services 1004, and determine that each user is authorized for the requested ride service. In some embodiments, ride services 1008 can identify an appropriate provider using a location obtained from a requestor and location services 1006 to identify, e.g., a closest provider. As such, ride services 1008 can manage the distribution and allocation of provider and requestor resources, consistent with embodiments described herein.

Management system 1002 can connect to various devices through network 1010 and 1012. Networks 1010, 1012 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 1010, 1012 can include local area networks (LAN), such as Ethernet, Token-Ring or other LANs. Networks 1010, 1012 can include a wide-area network and/or the Internet. In some embodiments, networks 1010, 1012 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 1010, 1012 can include a mobile network, such as a mobile telephone network, cellular network, satellite network, or other mobile network. Networks 1010, 1012 may be the same as communication network 170 in FIG. 1. In some embodiments, networks 1010, 1012 may each include a combination of networks described herein or other networks as are known to one of ordinary skill in the art.

Users may then utilize one or more services provided by management system 1002 using applications executing on provider and requestor devices. As shown in FIG. 10, provider computing devices 1014, 1016, 1018, and/or 1020 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 1010, 1012. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 1014 can include a vehicle-integrated computing device, such as a vehicle navigation system, or other computing device integrated with the vehicle itself In some embodiments, provider computing device 1018 can include a provider communication device configured to communicate with users, such as drivers, passengers, pedestrians, and other users. In some embodiments, provider communication device 1018 can communicate directly with management system 1002 or through another provider computing device, such as provider computing device 1016. In some embodiments, a requestor computing device can communicate 1026 directly with provider communication device 1018 over a peer-to-peer connection, Bluetooth connection, NFC connection, ad hoc wireless network, or any other communication channel or connection. Although particular devices are shown as communicating with management system 1002 over networks 1010 and 1012, in various embodiments, management system 1002 can expose an interface, such as an application programming interface (API) or service provider interface (SPI) to enable various third parties which may serve as an intermediary between end users and management system 1002.

Although requestor/provider management environment 1000 is shown with four provider devices and two requestor devices, any number of devices may be supported. The various components shown and described herein may be implemented in hardware, firmware, software, or combinations thereof. Although one embodiment of a requestor/provider management environment is depicted in FIG. 10, this is merely one implementation and not meant to be limiting.

Figure 11:
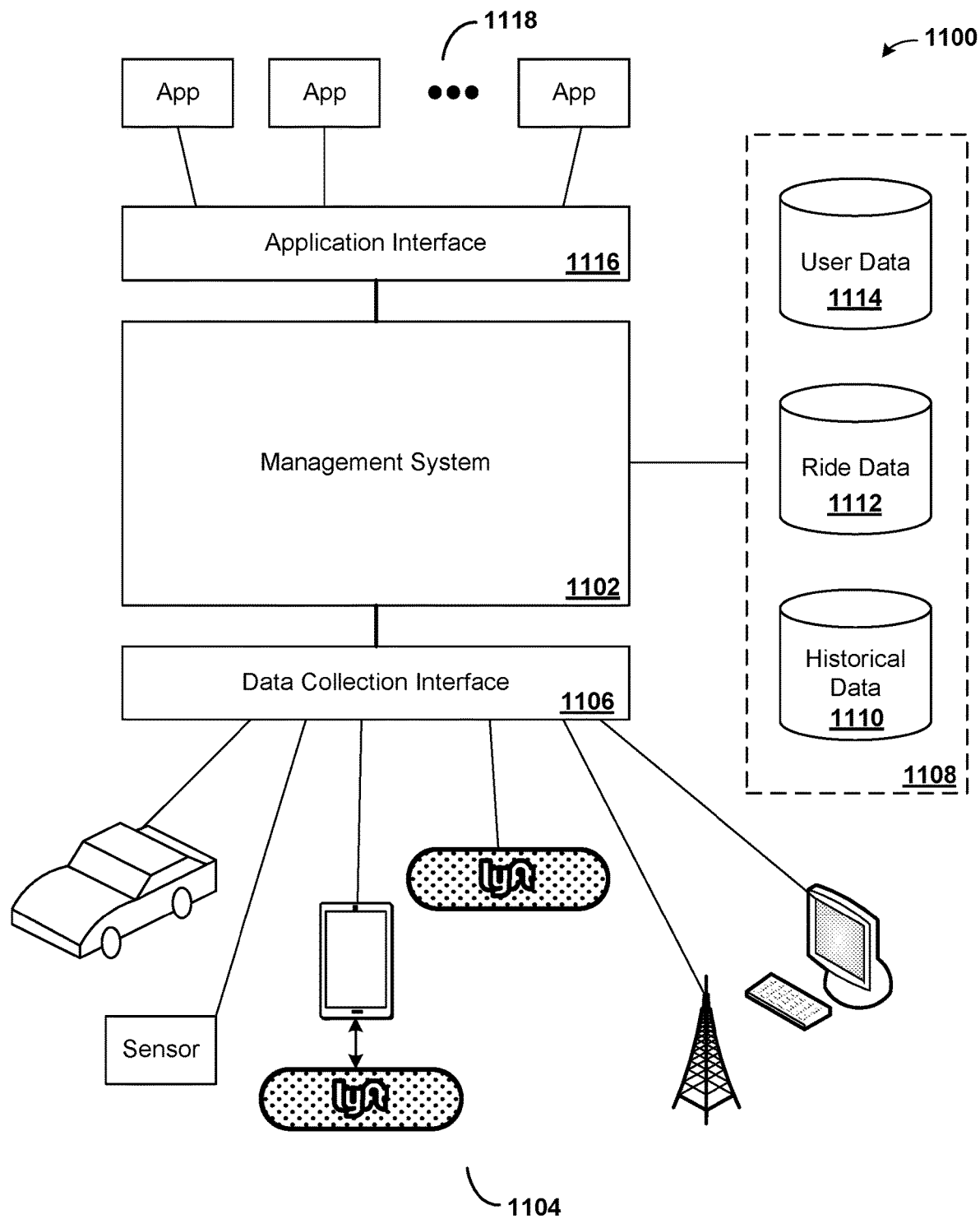
FIG. 11 illustrates an example data collection and application management system, in accordance with various embodiments.

FIG. 11 shows a data collection and application management environment 1100, in accordance with various embodiments. As shown in FIG. 11, management system 1102 may be configured to collect data from various data collection devices 1104 through a data collection interface 1106. As discussed above, management system 1102 may include one or more computers and/or servers or any combination thereof. Data collection devices 1104 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1106 can include, e.g., an extensible device framework configured to support interfaces for each data collection device. In various embodiments, data collection interface 1106 can be extended to support new data collection devices as they are released and/or to update existing interfaces to support changes to existing data collection devices. In various embodiments, data collection devices may communicate with data collection interface 1106 over one or more networks. The networks may include any network or communication protocol as would be recognized by one of ordinary skill in the art, including those networks discussed above.

As shown in FIG. 11, data received from data collection devices 1104 can be stored in data store 1108. Data store 1108 can include one or more data stores, such as databases, object storage systems and services, cloud-based storage services, and other data stores. For example, various data stores may be implemented on a non-transitory storage medium accessible to management system 1102, such as historical data store 1110, ride data store 1112, and user data store 1114. Data stores 1108 can be local to management system 1102, or remote and accessible over a network, such as those networks discussed above or a storage-area network or other networked storage system. In various embodiments, historical data 1110 may include historical traffic data, weather data, request data, road condition data, or any other data for a given region or regions received from various data collection devices. Ride data 1112 may include route data, request data, timing data, and other ride related data, in aggregate and/or by requestor or provider. User data 1114 may include user account data, preferences, location history, and other user-specific data. Although particular data stores are shown, any data collected and/or stored according to the various embodiments described herein may be stored in data stores 1108.

As shown in FIG. 11, an application interface 1116 can be provided by management system 1102 to enable various apps 1118 to access data and/or services available through management system 1102. Apps 1118 can run on various user devices (including provider and requestor computing devices, such as those discussed above) and/or may include cloud-based or other distributed apps configured to run across various devices (e.g., computers, servers, or combinations thereof). Apps 1118 may include, e.g., aggregation and/or reporting apps which may utilize data 1108 to provide various services (e.g., third-party ride request and management apps). In various embodiments, application interface 1116 can include an API and/or SPI enabling third party development of apps 1118. In some embodiments, application interface 1116 may include a web interface, enabling web-based access to data 1108 and/or services provided by management system 1102. In various embodiments, apps 1118 may run on devices configured to communicate with application interface 1116 over one or more networks. The networks may include any network or communication protocol as would be recognized by one of ordinary skill in the art, including those networks discussed above, in accordance with an embodiment of the present disclosure.

Although a particular implementation of environment 1100 is shown in FIG. 11, this is for illustration purposes only and not intended to be limited. In some embodiments, environment 1100 may include fewer or more components, as would be recognized by one or ordinary skill in the art.

Figure 12A:
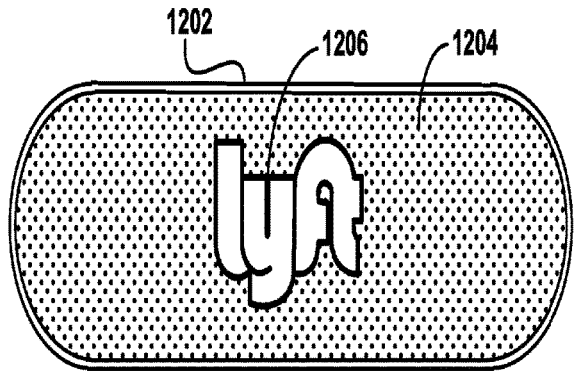
FIGS. 12A-12C illustrates an example provider communication device in accordance with various embodiments.
Figure 12B:
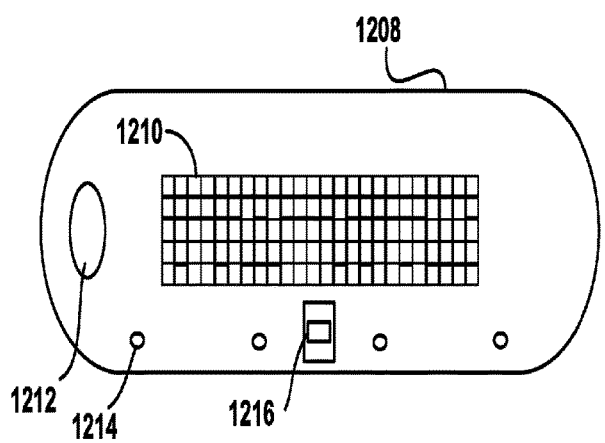
Figure 12C:
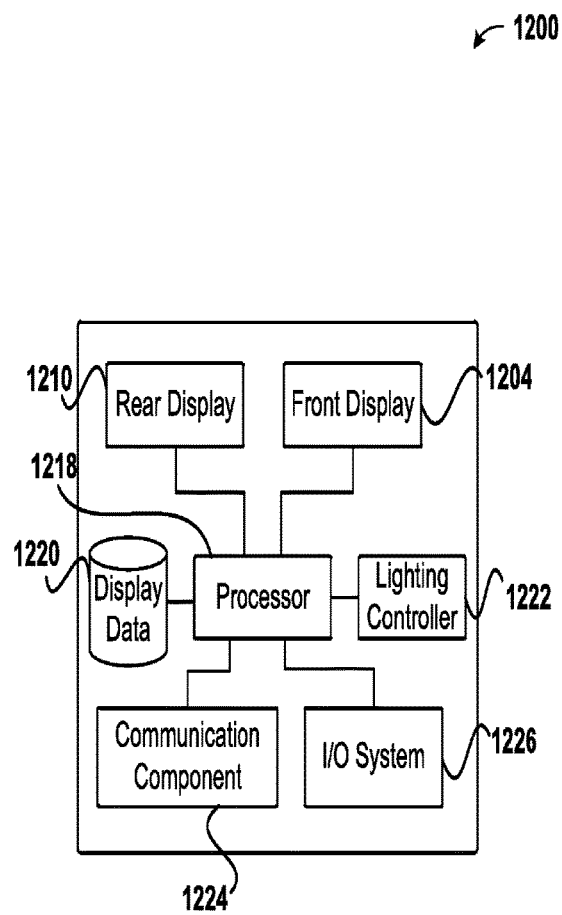

FIGS. 12A-12C show an example provider communication device 1200 in accordance with various embodiments. As shown in FIG. 12A, a front view 1202 of provider communication device 1200 shows a front display 1204. In some embodiments, front display 1204 may include a secondary region or separate display 1206. As shown in FIG. 12A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 1204 can be configured to show colors, patterns, color patterns, or other identifying information to requestors and other users external to a provider vehicle. In some embodiments, the secondary region or separate display 1206 may be configured to display the same, or contrasting, information as front display 1204.

As shown in FIG. 12B, a rear view 1208 of provider communication device 1200 shows a rear display 1210. Rear display 1210, as with front display 1204, rear display 1210 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 1210 may be configured to provide information to users external to the provider vehicle who are located behind the provider vehicle. As further shown in FIG. 12B, provider communication device may include a power button 1212 or other switch which can be used to turn on or off the provider communication device. In various embodiments, power button 1212 may be a hardware button or switch that physically controls whether power is provided to provider communication device 1200. Alternatively, power button 1212 may be a soft button that initiates a startup/shutdown procedure managed by software and/or firmware instructions. In some embodiments, provider communication device 1200 may not include a power button 1212. Additionally, provider communication device may include one or more light features 1214 (such as one or more LEDs or other light sources) configured to illuminate areas adjacent to the provider communication device 1200. In some embodiments, provider communication device 1200 can include a connector to enable a provider computing device to be connected to the provider communication device 1200. In some embodiments, power may be provided to the provider communication device through connector 1216.

FIG. 12C shows a block diagram of provider computing device 1200. As shown in FIG. 12C, provider communication device can include a processor 1218. Processor 1218 can control information displayed on rear display 1210 and front display 1204. As noted, each display can display information to different users, depending on the positioning of the users and the provider communication device. In some embodiments, display data 1220 can include stored display patterns, sequences, colors, text, or other data to be displayed on the front and/or rear display. In some embodiments, display data 1220 can be a buffer, storing display data as it is received from a connected provider computing device. In some embodiments, display data 1220 can include a hard disk drive, solid state drive, memory, or other storage device including information from a management system. In some embodiments, lighting controller 1222 can manage the colors and/or other lighting displayed by light features 1214. In some embodiments, communication component 1224 can manage networking or other communication between the provider communication device 1200 and one or more networking components or other computing devices. In various embodiments, communication component 1224 can be configured to communicate over Wi-Fi, Bluetooth, NFC, RF, or any other wired or wireless communication network or protocol. In some embodiments, provider communication device 1200 can include an input/output system 1226 configured to provide output in addition to that provided through the displays and/or to receive inputs from users. For example, I/O system 1226 can include an image capture device configured to recognize motion or gesture-based inputs from a user. Additionally, or alternatively, I/O system 1226 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 13:
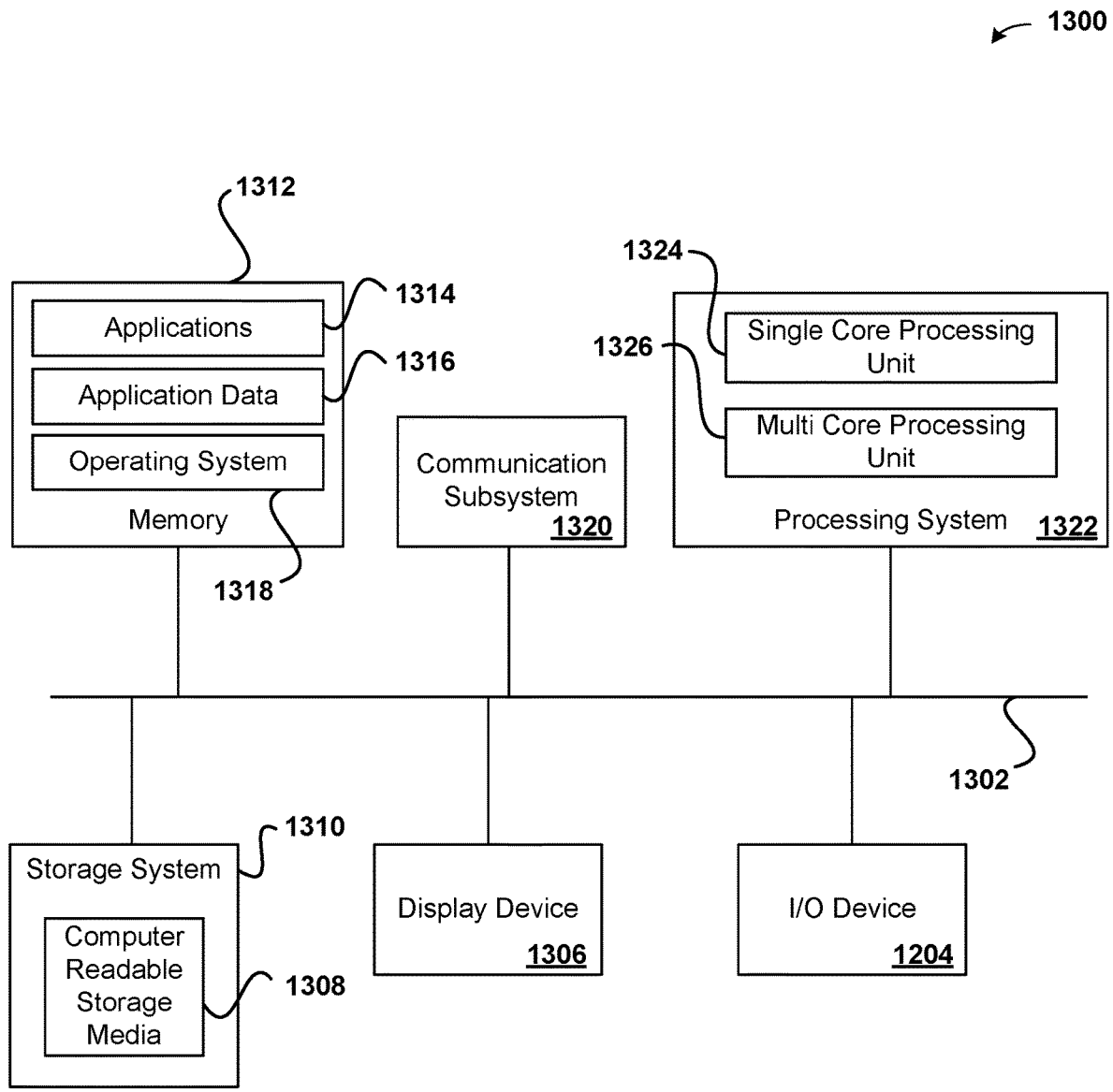
FIG. 13 illustrates an example computer system, in accordance with various embodiments.

FIG. 13 shows an example computer system 1300, in accordance with various embodiments. In various embodiments, computer system 1300 may be used to implement any of the systems, devices, or methods described herein. In some embodiments, computer system 1300 may correspond to any of the various devices described herein, including, but not limited, to mobile devices, tablet computing devices, wearable devices, personal or laptop computers, vehicle-based computing devices, or other devices or systems described herein. As shown in FIG. 13, computer system 1300 can include various subsystems connected by a bus 1302. The subsystems may include an I/O device subsystem 1304, a display device subsystem 1306, and a storage subsystem 1310 including one or more computer readable storage media 1308. The subsystems may also include a memory subsystem 1312, a communication subsystem 1320, and a processing subsystem 1322.

In system 1300, bus 1302 facilitates communication between the various subsystems. Although a single bus 1302 is shown, alternative bus configurations may also be used. Bus 1302 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1302 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1304 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1304 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1300 may include a display device subsystem 1306. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1306 may include a controller and/or interface for controlling and/or communicating with an external display, such as any of the above-mentioned display technologies.

As shown in FIG. 13, system 1300 may include storage subsystem 1310 including various computer readable storage media 1308, such as hard disk drives, solid state drives (including RAM-based and/or flash-based SSDs), or other storage devices. In various embodiments, computer readable storage media 1308 can be configured to store software, including programs, code, or other instructions, that is executable by a processor to provide functionality described herein. In some embodiments, storage system 1310 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1310 can include a media reader, card reader, or other storage interface to communicate with one or more external and/or removable storage devices. In various embodiments, computer readable storage media 1308 can include any appropriate storage medium or combination of storage media. For example, computer readable storage media 1308 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be transmitted and/or received.

Memory subsystem 1312 can include various types of memory, including RAM, ROM, flash memory, or other memory. Memory 1312 can include SRAM (static RAM) or DRAM (dynamic RAM). In some embodiments, memory 1312 can include a BIOS (basic input/output system) or other firmware configured to manage initialization of various components during, e.g., startup. As shown in FIG. 13, memory 1312 can include applications 1314 and application data 1316. Applications 1314 may include programs, code, or other instructions, that can be executed by a processor. Applications 1314 can include various applications such as browser clients, location management applications, ride management applications, data management applications, and any other application. Application data 1316 can include any data produced and/or consumed by applications 1314. Memory 1312 can additionally include operating system 1318, such as macOS®, Windows®, Linux®, various UNIX® or UNIX- or Linux-based operating systems, or other operating systems.

System 1300 can also include a communication subsystem 1320 configured to facilitate communication between system 1300 and various external computer systems and/or networks (such as the Internet, a local area network (LAN), a wide area network (WAN), a mobile network, or any other network). Communication subsystem 1320 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 130 in FIG. 1. Additionally, or alternatively, communication subsystem 1320 can include hardware and/or software components to communicate with satellite-based or ground-based location services, such as GPS (global positioning system). In some embodiments, communication subsystem 1320 may include, or interface with, various hardware or software sensors. The sensors may be configured to provide continuous or and/or periodic data or data streams to a computer system through communication subsystem 1320.

As shown in FIG. 13, processing system 1322 can include one or more processors or other devices operable to control computing system 1300. Such processors can include single core processors 1324, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1322, such as processors 1324 and 1326, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The invention claimed is:

1. A method comprising, by one or more computing devices:
    receiving, using one or more sensors of a vehicle, sensor data associated with an environment surrounding the vehicle, the sensor data comprising at least one entity located external to the vehicle;
    determining, based on the sensor data, a current movement context associated with the vehicle, wherein the current movement context comprises at least characteristics of a road of the environment in which the vehicle is currently travelling;
    determining, based on the current movement context associated with the vehicle, a set of predefined messages, the set of predefined messages being suitable to provide to one or more entities likely be affected by the characteristics of the road in which the vehicle is currently travelling;
    selecting, based on the current movement context associated with the vehicle and a location of the at least one entity relative to the vehicle, (1) a message from the set of predefined messages associated with the current movement context of the vehicle, and (2) at least one notification device of a plurality of notification devices of the vehicle for providing the message to the at least one entity; and
    providing the message to the at least one entity utilizing the at least one notification device.

2. The method of claim 1, further comprising:
    associating one or more positions relative to the vehicle with the at least one notification device in a notification device map;
    wherein selecting the at least one notification device of the plurality of notification devices comprises identifying a notification device based on the current movement context and the notification device map.

3. The method of claim 2, wherein a plurality of identifiers for the plurality of notification devices are stored in association with a position relative to the vehicle;
    wherein selecting the at least one notification device of the plurality of notification devices comprises identifying the identifier for the at least one notification device based on the current movement context.

4. The method of claim 3, further comprising:
    storing the plurality of identifiers for the plurality of notification devices and the associated positions relative to the vehicle in the notification device map for the vehicle.

5. The method of claim 3, wherein each of the plurality of identifiers for the plurality of notification devices comprises a network address or an endpoint.

6. The method of claim 1, further comprising:
    associating one or more notification devices of the plurality of notification devices with an angle measured from a direction of travel of the vehicle; and
    wherein selecting the at least one notification device of the plurality of notification devices comprises comparing the angle associated with the one or more notification devices of the plurality of notification devices with a relative angle of the at least one entity with respect to the vehicle.

7. The method of claim 1, further comprising:
    detecting a change in the current movement context;
    selecting another notification device of the plurality of notification devices of the vehicle based on the change in the current movement context; and
    providing the message to the at least one entity utilizing the another notification device.

8. The method of claim 7, wherein detecting the change in the current movement context comprises:
    subsequent to providing the message to the at least one entity utilizing the at least one notification device, determining a second movement context associated with the vehicle.

9. The method of claim 8, wherein selecting the another notification device based on the change in the current movement context comprises:
    identifying a second notification device of the plurality of notification devices based on the second movement context associated with the vehicle; and
    determining that the second notification device is configured to provide the message to the at least one entity based on the second movement context associated with the vehicle.

10. The method of claim 1, further comprising:
    determining an entity type of the at least one entity; and
    determining the message to be provided to the at least one entity based on the determined entity type of the at least one entity, wherein the message is specific to the entity type of the at least one entity.

11. The method of claim 1 further comprising:
    determining a type of the message to be provided to the at least one entity; and selecting the at least one notification device of the plurality of notification devices based on the determined type of the message.

12. The method of claim 1, further comprising:
determining one or more characteristics of the at least one entity; and
determining a second movement context associated with the entity based on the one or more characteristics of the at least one entity.

13. The method of claim 12, wherein the second movement context comprises a predicted movement of the at least one entity.

14. The method of claim 1, wherein the message comprises an indication that the vehicle has been matched to the at least entity in response to a ride request received by a ride matching system.

15. The method of claim 1, wherein determining the current movement context associated with the vehicle comprises:
matching the sensor data to one or more predefined movement contexts.

16. The method of claim 1, wherein providing the message to the at least one entity utilizing the at least one notification device comprises:
displaying the message to the at least one entity utilizing the at least one notification device.

17. One or more non-transitory computer-readable media, wherein the media comprise instructions that, when executed by one or more processors, cause the one or more processors to:
receive, using one or more sensors of a vehicle, sensor data associated with an environment surrounding the vehicle, the sensor data comprising at least one entity located external to the vehicle;
determine, based on the sensor data, a current movement context associated with the vehicle, wherein the current movement context comprises at least characteristics of a road of the environment in which the vehicle is currently travelling;
determine, based on the current movement context associated with the vehicle, a set of predefined messages, the set of predefined messages being suitable to provide to one or more entities likely be affected by the characteristics of the road in which the vehicle is currently travelling;
select, based on the current movement context associated with the vehicle and a location of the at least one entity relative to the vehicle, (1) a message from the set of predefined messages associated with the current movement context of the vehicle, and (2) at least one notification device of a plurality of notification devices of the vehicle for providing the message to the at least one entity; and
provide the message to the at least one entity utilizing the at least one notification device.

18. A computing system comprising:
one or more processors; and
one or more computer-readable non-transitory storage media coupled to the one or more processors and comprising instructions that, when executed by the one or more processors, cause the computing system to:
receive, using one or more sensors of a vehicle, sensor data associated with an environment surrounding the vehicle, the sensor data comprising at least one entity located external to the vehicle;
determine, based on the sensor data, a current movement context associated with the vehicle, wherein the current movement context comprises at least characteristics of a road of the environment in which the vehicle is currently travelling;
determine, based on the current movement context associated with the vehicle, a set of predefined messages, the set of predefined messages being suitable to provide to one or more entities likely be affected by the characteristics of the road in which the vehicle is currently travelling;
select, based on the current movement context associated with the vehicle and a location of the at least one entity relative to the vehicle, (1) a message from the set of predefined messages associated with the current movement context of the vehicle, and (2) at least one notification device of a plurality of notification devices of the vehicle for providing the message to the at least one entity; and
provide the message to the at least one entity utilizing the at least one notification device.

19. The method of claim 1, wherein the characteristics of the road comprises one or more roadway conditions, road signs, traffic conditions, intersection, or crosswalk.

* * * * *